March 3, 1964     K. A. RUDDOCK ETAL     3,123,766
AIRBORNE ELECTROMAGNETIC PROSPECTING APPARATUS HAVING
A LIGHTWEIGHT TRUSS STRUCTURE TO SUPPORT
TRANSMITTER AND RECEIVER COILS Filed Nov. 5, 1959     5 Sheets-Sheet 1

KENNETH A. RUDDOCK
ROLAND R. ILSEN
ALBERTO L. LAICH
*INVENTORS*

BY

*ATTORNEY*

KENNETH A. RUDDOCK
ROLAND R. ILSEN
ALBERTO R. LAICH
INVENTORS

BY Paul B. Hunter
ATTORNEY

March 3, 1964 K. A. RUDDOCK ETAL 3,123,766
AIRBORNE ELECTROMAGNETIC PROSPECTING APPARATUS HAVING
A LIGHTWEIGHT TRUSS STRUCTURE TO SUPPORT
TRANSMITTER AND RECEIVER COILS
Filed Nov. 5, 1959 5 Sheets-Sheet 4

KENNETH A. RUDDOCK
ROLAND R. ILSEN
ALBERTO L. LAICH
*INVENTORS*

BY *Paul B. Hunter*

*ATTORNEY*

United States Patent Office 3,123,766
Patented Mar. 3, 1964

3,123,766
AIRBORNE ELECTROMAGNETIC PROSPECTING APPARATUS HAVING A LIGHTWEIGHT TRUSS STRUCTURE TO SUPPORT TRANSMITTER AND RECEIVER COILS
Kenneth A. Ruddock, Palo Alto, Roland R. Ilsen, Mountain View, and Alberto L. Laich, San Carlos, Calif., assignors, by direct and mesne assignments, to Varian Associates, Palo Alto, Calif., a corporation of California
Filed Nov. 5, 1959, Ser. No. 851,139
17 Claims. (Cl. 324—4)

This invention relates to airborne electromagnetic prospecting of the type wherein a transmitter coil system and a receiver coil system are carried by an aircraft and flown over a region which is being explored for the purpose of discovering underground or underwater conducting bodies; indications of the existence of such bodies being obtained by generating a primary alternating magnetic field with the transmitter coil system thereby inducing eddy currents in the conductive regions linking the primary field and detecting the secondary alternating magnetic field generated by such eddy currents as a signal anomaly in the receiver coil system.

The above prospecting technique is especially useful in locating buried sulphide ore bodies which may prove to be important deposits of sulphur (pyrite or pyrrhotite) and/or sulfides of valuable metals such as copper, lead, zinc, and nickel. Such bodies may be quite effectively discovered and distinguished from conducting terrain features by operating the magnetic coils at a low audio frequency of the order of 400 cycles and providing separate records of the components of the secondary magnetic field which are in-phase and out-of-phase, respectively, with respect to the primary magnetic field. The phase angle of a recorded anomaly signal will generally be above 45° (out-of-phase component greater than in-phase component) in the case of terrain features, whereas massive sulfide bodies exhibit phase angles less than 45° (in-phase component greater than out-of-phase component). Further, high resolution records of the variation in the separate amplitudes of the in-phase and out-of-phase components of the anomaly signal obtained while flying over the region of a conducting body provides valuable information to geologists in estimating the conductivity and extent of a deposit and in locating an advantageous drilling point.

A known arrangement for the purpose of airborne electromagnetic prospecting is disclosed in U.S. Patent 3,108,220 to which reference is made for supplementary background information. This arrangement consists of a transmitter coil mounted on a support attached to and extending approximately 10 feet in front of the nose of a helicopter and a receiver coil mounted on a second support attached to and extending approximately 8 feet to the rear of the tail cone of the helicopter, the coils being coaxially disposed and separated through the combined spacing of the two coil supports and the helicopter body by a distance of 50 to 60 feet. Although this arrangement is generally quite effective, it is subject to certain significant limitations, including the following: (1) A large 8–10 man helicopter is required. Such a helicopter is quite costly to obtain, operate and maintain and its use for detailed exploration purposes is often impractical. (2) The large helicopter having the coils permanently attached thereto is limited in maneuverability and adaptability. For example, it is difficult to accurately maintain a flight pattern which is of sufficient closeness that a detailed, high resolution record for a full evaluation of a discovered electromagnetic anomaly may be obtained. Further, it is not practical to use this helicopter for performing many of the supplementary functions required to support an exploration party, particularly in overgrown and uninhabited regions. (3) The helicopter body forms part of the coil separating structure. During flight, especially in the presence of appreciable air currents, the body structural members and particularly the tail cone undergo relatively large deflections thereby introducing noise due to variations in the direct coupling between the transmitter and receiver coils and lowering the sensitivity and usefulness of the recorded signals. On days of particularly rough air the sensitivity may be so low as to completely prevent the obtaining of useful records and cause costly delays.

It is the principal object of the present invention to provide novel airborne electromagnetic prospecting apparatus for obtaining sensitive, high resolution electromagnetic anomaly records with an inexpensive, easily maneuverable, lightweight helicopter.

One feature of the present invention is the provision of a very lightweight truss, the length of which remains essentially constant under changing load conditions.

Another feature of the present invention is the provision of a truss in accordance with the preceding paragraph which may be carried by a small, lightweight helicopter and which is adapted to be used in a boom for supporting electromagnetic prospecting coils at a precisely fixed relative distance.

Another feature of the present invention is the provision of a boom in accordance with the preceding paragraph wherein the end sections of the boom are of non-metal construction, thus eliminating noise caused by motion between the coils and close metal objects.

Another feature of the present invention is the provision of a boom in accordance with the preceding paragraph which may be readily installed or removed from the aircraft, thus permitting it to be used for other purposes such as moving ground parties, drill rigs, supplies, gasoline, and other prospecting instruments.

Another feature of the present invention is the provision of a boom in accordance with the preceding paragraph which may be readily broken down into smaller units for purposes of shipment, especially to and from remote exploration bases.

Another feature of the present invention is the provision of mu-metal shields for the aircraft magnetos and generator which reduce magnetic noise in the passband of the receiver coil thereby permitting a substantial reduction in the transmitter coil size, weight and exciting power.

Another feature of the present invention is the provision of a vibration isolating suspension system for mounting a boom beneath an aircraft so that vibrations in the aircraft will not be transmitted to the boom and installation of the boom will not change any of the natural vibration frequencies in the aircraft structure.

Another feature of the present invention is the provision of a weight-shifting structure for precise location of the center of gravity of a boom mounted in accordance with the preceding paragraph thereby achieving a maximum of vibration isolation and stability.

Another feature of the present invention is the provision of a structure for rigidly mounting the receiver coil relative to a buck-out coil and a calibration coil, said structure being supported on flexible shock mounts so as to eliminate noise due to the high frequency vibration of the receiver coil in the earth's magnetic field.

Another feature of the present invention is the provision of a fine buck-out and calibration circuit for use in combination with the calibration coil of the preceding paragraph thereby permitting a fine adjustment in eliminating the effect of the primary field at the location of the receiver coil, and also enabling the introduction of a signal of known strength into the receiver coil system in order to calibrate the electromagnetic anomaly record and detect any malfunction in the apparatus which would render the record useless and waste valuable flying time.

Another feature of the present invention is the provision of a receiving circuit for recording electromagnetic anomaly signals so as to provide a maximum of high sensitivity, immediately recognizable information with a minimum of additional weight.

These and other features and advantages of the present invention will become apparent upon a perusal of the following specification taken in connection with the accompanying drawings wherein.

Figure 1:
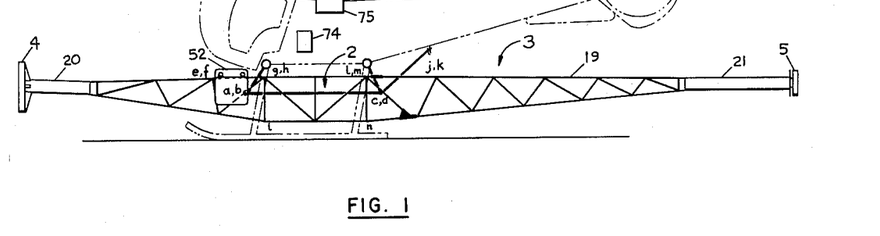
FIG. 1 is an elevational view of an airborne electromagnetic prospecting structure in accordance with the present invention.
Figure 2:
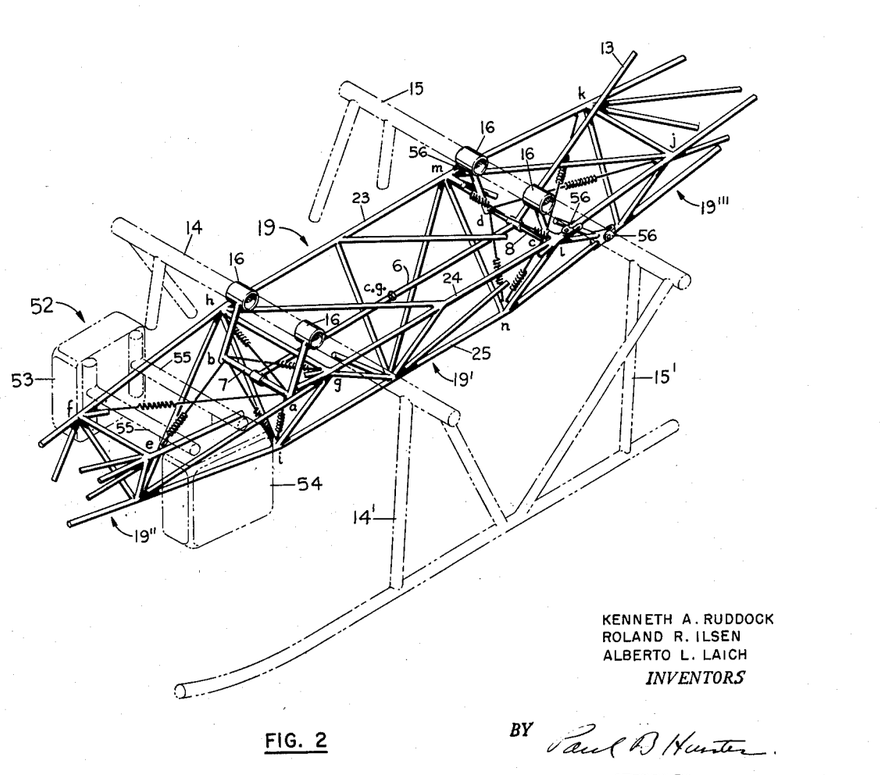
FIG. 2 is an isometric view of the central portion of the boom and supporting structure of FIG. 1.
Figures 3, 5:
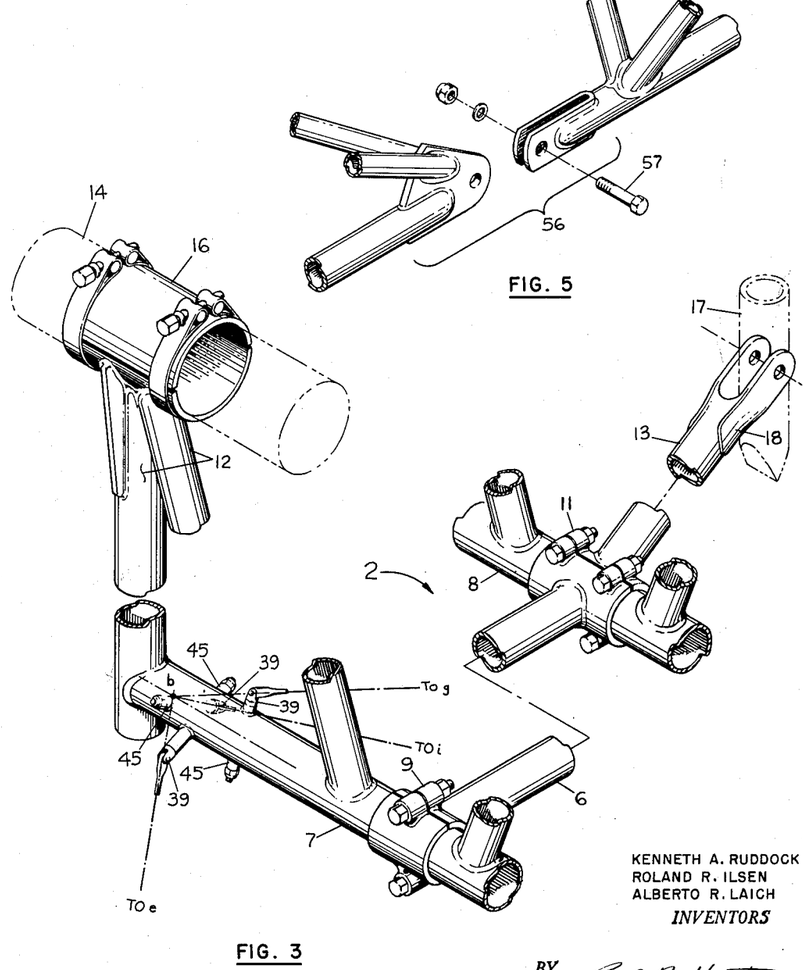
FIG. 3 is a fragmentary, isometric view of the boom supporting structure of FIG. 1.
FIG. 5 is an exploded view of a typical quick-disconnect joint in the truss of FIG. 2.

Referring now to FIGS. 1, 2 and 3, the novel airborne electromagnetic prospecting apparatus of the present invention generally comprises a helicopter 1, a platform structure 2 rigidly attached to the helicopter 1, and a boom 3 supporting a transmitter coil 4 and a receiver coil 5 at opposite ends thereof, boom 3 being mounted to platform 2 by means of a vibration isolating spring-cable suspension system to be described subsequently. As will become apparent, the prospecting apparatus, including the boom, supporting structure and detection equipment yields very sensitive, high resolution electromagnetic records with a minimum of additional weight, frontal area, side surface or other adverse effects on the normal aircraft operation, thus permitting the use of a small, lightweight, easily maneuverable, aircraft. In the exemplary embodiment of FIG. 1, the aircraft is a 2-3 man helicopter known as the Bell 47-G2. However, other suitable aircraft are presently commercially available including, for example, the Hiller 12E helicopter.

The boom supporting platform 2 comprises a long longitudinally extending tubular member 6 attached at the ends thereof to the midpoints of short transverse tubular members 7 and 8. Member 6 is detachable at clamps 9 and 11 in order to permit the insertion of said member interior to the boom structure 3. Platform 2 is rigidly secured to the body of the helicopter 1 by means of tubular supports 12 welded to transverse members 7 and 8 and tubular support 13 attached to member 8 at clamp 11. Supports 11 and 12 are attached to the fore landing gear spring tube 14 and the aft landing gear spring tube 15, respectively, by four band clamp assemblies 16. Support 13 is attached to the helicopter jack point 17 by a bolt through clevis end joint 18.

The boom 3 comprises a tubular welded truss 19 and non-metallic fiberglass tubes 20, 21 adjoining coils 4 and 5, respectively. Since the direct coupling between the transmitter coil and receiver coil is less sensitive to relative movement of the coils with greater separation between the coils, boom 3 should be as long as possible consistent with the weight and stability requirements of the aircraft. In the exemplary embodiment of FIG. 1, boom 3 is approximately 50 feet long. The fiberglass sections 20 and 21 are sufficiently long to effectively remove coils 4 and 5 from noise caused by relative movement with respect to the metal helicopter body and truss.

Truss 19 comprises two upper cap members 23, 24 and a lower cap member 25, said cap members being triangularly spaced by transverse and diagonal supporting tubes to form the lightest possible structure consistent with the rigidity requirement that departure of coils 4 and 5 from precise coaxial alignment be small enough to maintain the relative motion noise level well below the electromagnetic anomoly signal level. A suitable lightweight, high rigidity material for both the tubular platform structure 2 and the tubular truss structure 19 is AISI No. 4130, chromium-molybdenum steel. In the exemplary embodiment, the cap members 23, 24, 25 are 464 inches long; and the cross-section at middle section 19' is an isosceles triangle with a 28" base between members 23 and 24 and a 28" height. The total weight of the boom and support is only about 200 pounds.

The boom 3 is supported from platform 2 by a tripod of three spring-cable assemblies extending from each of four high strength attachment points $a$, $b$, $c$, $d$ at the ends of transverse members 7 and 8 to attachment points at truss joints $e$ through $n$. Cables $a$—$i$, $b$—$i$, $c$—$n$, $d$—$n$, extending in and down to lower cap member 25, primarily carry the vertical down loads; cables $a$—$h$, $c$—$m$, extending in, up and across to upper cap member 23, and cables $b$—$g$, $d$—$l$, extending in, up and across to upper cap member 24, primarily carry the side loads; and cables $a$—$f$, $c$—$k$ extending out, up and across to cap member 23, and cables $b$—$e$, $d$—$j$ extending out, up and across to cap member 24 primarily carry the fore and aft loads.

Figure 4:
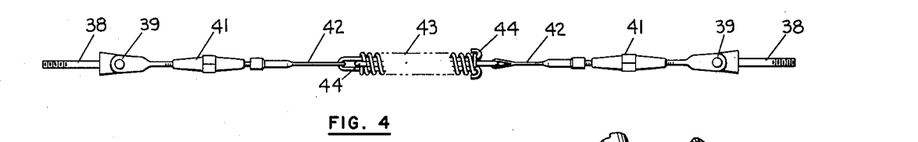
FIG. 4 is an elevational view of a typical spring-cable assembly in the suspension system of FIG. 12.

FIG. 4 shows a detailed view of a typical spring-cable assembly comprising an eye bolt 38 and swivel joint 39 at each end, one or more turnbuckles 41 for adjusting the alignment of the boom, suitable lengths of cable 42, and a spring 43. Spring 43 is compressed by hooks 44 under the tension loads and will deflect a distance of about 1.13 inches before closing. This deflection will allow the boom sufficient movement for ordinary loading conditions and yet will stop the movement before it becomes destructively large. The spring-cable assembly is preferably made of a carbon steel. Referring to FIG. 3, the eyebolt 38 at one end of each cable is secured in a spacer 45 extending through platform tubes 7 and 8 sufficiently far that the lines of action of each tripod of springs advantageously intersect in a single origin point on the tube axis as illustrated by the termination at point $b$. The eye bolt 38 at the other end of the assembly is similarly secured by a spacer inserted transversely through a tube near truss junctions *e* through *n*.

To provide effective mechanical vibration isolation between the helicopter body and the boom, three conditions must be substantially satisfied. First, motions of the boom in each degree of freedom should be decoupled from the motions in all other degrees of freedom. This is satisfied when the spring constant component in any direction at the attachment points are inversely proportional to the distance of said attachment point to the center of gravity (c.g.) of the suspended body. The second requirement is that the lines of action of the spring forces be parallel to the line of action of any force acting on the c.g., and this is satisfied when the spring attachment points and the c.g. are coplanar. Third, the natural frequency of the suspended mass in each degree of freedom should be within a frequency band which is less than any of the vibrational frequencies in the helicopter body, but greater than the stick movement frequency of about one cycle per second. Such isolation may be effectively accomplished by making the spring constants at *a* and *b* equal and also the spring constants at *c* and *d* equal, and then locating the center of gravity along the longitudinal platform member 6 such that the ratio of spring constants at points *a*, *b* to the spring constants at points *c*, *d* is inversely proportional to the ratio of the distance from c.g. of points *a*, *b* to the distance from c.g. of points *c*, *d*. In addition, the sum of the above four spring constants is equal to that for a single spring through c.g. which yields a frequency within the desired band. Thus all the translational modes will be equal and within the desired band. Further the described geometry of attachment points also enables the placement of the frequencies of the three rotational modes within the desired band.

In the illustrated embodiment of FIG. 2 the c.g. is located substantially at the midpoint of platform tube 6 whereby the spring constants at all four attachment points are conveniently made equal. As a further advantage it is to be noted that the c.g. is located directly below the rotor shaft 51 so as to provide the minimum effect on the normal operation of the helicopter. The weight W of the suspended mass is 245 pounds so that the spring constant $k$ required for a desired translation frequency $f$ of 3.6 cycles per second $$\left(f = \frac{1}{2\pi}\sqrt{\frac{kg}{W}}\right)$$

is 324 pounds per inch. Therefore the spring constant in any direction at each of the attachment points *a*, *b*, *c*, *d* is 81 pounds per inch.

It is apparent from the above that effective vibration isolation requires an accurate location of the c.g. point. This is accomplished in the present invention by means of a weight shifting structure 52 which supports part of the necessary prospecting equipment. This structure comprises a camera box 53 and an electronic equipment box 54 supported on the ends of two aluminum tubes 55 disposed transversely across cap members 23 and 24 such that the structure is balanced for a vertical load and does not create any moment at the truss center line. Precise location is then achieved by propping the boom on a knife edge placed at the desired c.g. point and then shifting the structure 52 until the entire suspended mass is balanced about that point. After this operation the structure 52 is securely bolted in place.

Figures 6, 6A:
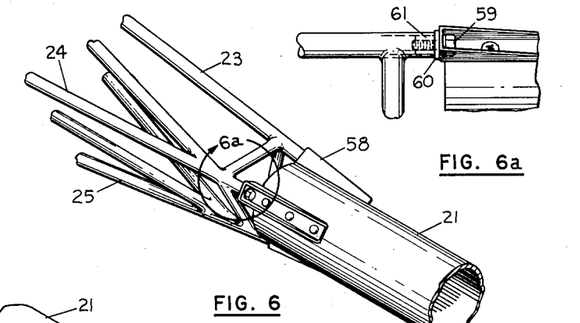
FIG. 6 is an isometric view of the attachment of the truss to the coil supporting tubes in the boom of FIG. 1.
FIG. 6a is a detailed view of portion 6a in FIG. 6.

The entire boom and supporting structure may be quickly removed from the helicopter by simply removing a pair of bolts at each band clamp assembly 16 and a single bolt at clevis joint 18. The helicopter is now free of substantially all the prospecting equipment and can be used as an unmodified helicopter to perform such additional functions as moving ground parties, supplies, drill rigs, gasoline, and other prospecting instruments. It is also to be noted that the prospecting equipment is readily transferable to another aircraft. Further, the boom can be broken down into four smaller units for ease of shipment. The truss section 19 breaks down into two parts by means of clevis-lever shear joint 56 shown in detail in FIG. 5, one joint being located in each of the cap members 23, 24 and 25. Joints 56 permit quick attachment and removal by means of a single bolt 57 and yet do not adversely affect the strength and rigidity of the truss. Referring to FIG. 6, the fiberglass support tubes 21, 22 are also readily attached and removed by a single bolt 59 at each of three bathtub fittings 58 bolted to each of said tubes. As shown in FIG. 6*a*, each bolt 59 extends through the end of a fittings 58, a washer 60, and into an attachment plug 61 inserted in each end of the three cap members 23, 24 and 25.

Figures 7, 8:
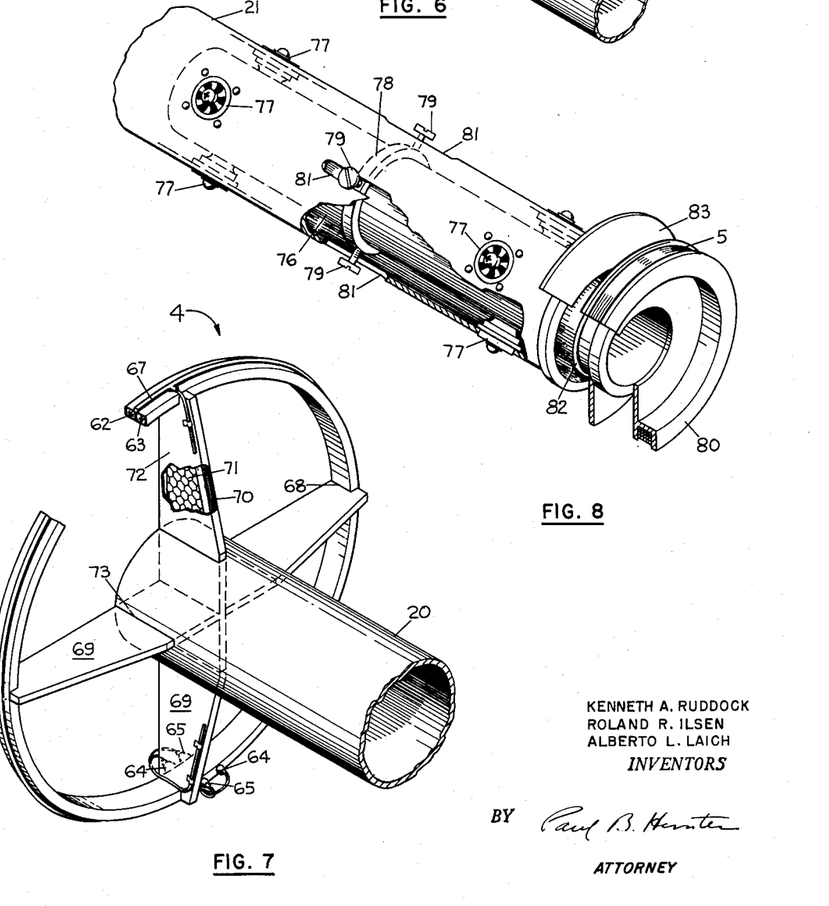
FIG. 7 is an isometric view, partially broken away, of the front transmitter coil assembly of FIG. 1.
FIG. 8 is an isometric view, partially broken away, of the rear receiver coil assembly of FIG. 1.

FIG. 7 shows the construction of the front transmitter coil 4. The coil is wound into two identical halves 62 and 63, each half containing 300 turns of No. 17 heavy Formvar aluminum wire. The coil input voltage is applied to lugs 64 which contact the two innermost layers of each half. Lugs 65 contact the outermost layer of each half and provide a connection for the leads to a center tap network to be described subsequently. A single loop of wire 67 is wrapped about the transmitter coil sections and provides an inductively coupled reference signal. The entire coil assembly is insulated and water-proofed by means of an epoxy filling between the turns of wire and an epoxy outer covering and seal. The coil is supported at joints 68 by two perpendicular fins 69 comprising a spruce wood frame 70, fiberglass honeycomb filling 71 and phenolic impregnated cloth covering 72. Fins 69 are attached to the fiberglass support tube 20 at joints 73. The joints 68 and 73 are sealed by means of an epoxy coated cloth. Thus, there is provided a strong, lightweight structure which removes all metal conducting bodies from the vicinity of the coil.

The magnetic moment of the transmitter coil is given by the formula $$\left[\frac{AWP}{4\pi d\rho}\right]^{1/2}$$

where A is the cross-sectional area of the coil, W is the weight of conductor in the coil, P is the power supplied to the coil, $d$ is the density of the conductor material, and $\rho$ is the volume resistivity of the conducting material. This moment must be sufficiently large to over-ride the receiver band-pass noise existing at the receiver coil 5. A principal source of such noise has been effectively removed by providing mu-metal magnetic shields about the magnetos 74 and generator 75 (FIG. 1), thereby enabling advantageous reductions in the values of A, W and P. The coil area was decreased from 28 square feet to 5.2 square feet thereby reducing the support, stability, and ground clearance requirements. The total coil weight was reduced from 50 pounds to 10 pounds. And the exciting power was decreased from 1500 watts to 250 watts thereby permitting a reduction in the weight of the power source inverter from 40 pounds to 14 pounds. Further it is to be noted that for fixed values of A, W, and P, a greater moment is obtained by using a conductor material of low $d\rho$ product, independent of wire size and number of turns. For example, the $d\rho$ product for aluminum is .557 of that for copper.

FIG. 8 shows the details of the rear receiver coil assembly which is also of non-metallic construction in order to eliminate noise due to the proximity of metal parts. The receiver coil 5, comprising 4600 turns of No. 27 heavy Formvar aluminum wire, water-proof epoxy sealed in a phenolic coil form 80, is secured to the end of a fiberglass tube 76. Tube 76 is mounted interior to the main fiberglass tube support 21 by means of two spaced apart sets of four circumferentially arranged rubber vibration isolating mounts 77. A main buck-out coil 78, comprising a single coaxial loop carried on the inside periphery of a phenolic ring, is fastened to tube 76 about 18 inches from the coil 5 by means of four nylon screws 79 extending exterior of tube 21 through slots 81. A fine buck-out and calibration coil 82 comprising a single turn of coaxial cable is epoxy sealed to the tube 82 about one inch in from the receiver coil 80. The main buck-out coil 78 is connected in series with the transmitter coil 4 and is adjusted to a position in slots 81 at which it produces a magnetic field at receiver coil 5 which is equal and opposite to that produced by the transmitter coil 4, thereby establishing a frequency independent condition of substantially zero direct coupling between transmitter coil 4 and receiver 5. This single buck-out arrangement has the advantages that only a single, simply determined, positioning operation is needed and that no extra boom length is required. The fine buck-out and calibration coil 82 cancels the small out-of-phase field component due to the presence of the helicopter and boom, readjusts the condition of zero direct (in-phase) coupling as the helicopter moves away from the ground and as the coil separation undergoes slow changes due to the temperature variations, and introduces a calibrating signal into the receiver system, all in a manner to be described subsequently with reference to FIG. 11.

The rubber mounts 77 isolate the receiver coil 5 from residual vibration existing in the boom, and thus serve to eliminate noise due to the vibration of the coil in the earth's field. A windshield 83 serves to reduce the motion of tube 76 on the flexible mounts 77. No significant noise is introduced by whatever motion remains, since coils 78 and 82 stay in fixed relative position on tube 72 and the effect of the relative movement with respect to transmitter coil 4 is of a smaller order of magnitude.

One of the most serious sources of noise in airborne electromagnetic prospecting is that caused by changes in axial separation of the transmitter and receiver coils resulting from bending of the separating structure as the aircraft is maneuvered along a flight line or encounters turbulent air. A fractional change $\Delta L/L$ in the coil separation causes a fractional change $\Delta H/H$ in the primary field at the receiver coil which is equal to $3\Delta L/L$. The signal to be expected from a typical conducting body is about 60 parts per million (p.p.m.) of the directly coupled field and the noise due to changes $\Delta L$ in the separation distance L should be not more than 1/3 of the above signal or 20 p.p.m. for satisfactory operation. In the exemplary embodiment $L=50$ feet so that the change in separation $\Delta L$ must be less than .004 inch. Generally stated, the problem presented is one of providing a very lightweight structure, the length of which remains essentially constant under changing load conditions. This problem is solved by the novel truss apparatus of the present invention.

Figure 9:
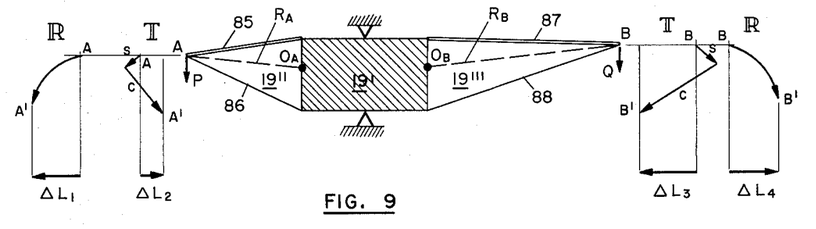
FIG. 9 is a schematic deflection diagram of a truss structure in accordance with the present invention.

Referring to FIG. 9, there is shown a schematic deflection diagram of truss 19. For purposes of analysis, truss 19 may be resolved into a single plane configuration comprising a secured center section 19', a front section 19'' having an upper cap member 85 and a lower cap member 86 and a rear section 19''' having an upper cap member 87 and a lower cap member 88. The stiffness of the various cap members in pounds per inch of deflection is proportional to the quantity $EA/L$, where E is the modulus of elasticity for the material in the member, A is the cross sectional area of the member, and L is the length of the member. Member 85 is stiffer than member 86, since it represents the combined cross-sections of both upper cap members 23, 24; and, by the same analysis, member 87 is stiffer than member 88. Member 85 is stiffer than member 87 since it is shorter; and, by the same analysis, member 86 is stiffer than member 88.

The loads P, Q on the ends A, B of the truss, which are proportional loads since they result from the same acceleration, produce a deflection of points A and B to points A' and B', respectively. Each deflection can be considered as a superposition of a separate rotation and translation of radius vectors $R_A$ and $R_B$, respectively. The rotational deflections are illustrated by enlarged deflection diagrams R and the translational deflections are illustrated by enlarged deflection diagrams T. The initial position of points A and B is above their respective centers of rotation $O_A$ and $O_B$ so that the deflection due to rotation in each case is outward. The longitudinal projections of these rotational deflections are designated by vectors $\Delta L_1$ and $\Delta L_4$. The translation of the radius vector is equal to the vector sum of the stretching S in the top member and the compression C in the bottom member. As the top member on each side is stiffer than the bottom member, the compression is greater than the stretching so that the net translational deflection on each side is inward. However, since rear section members 87 and 88 are less stiff than the corresponding front section members 85 and 86, the longitudinal projection $\Delta L_3$ of the rear translational deflection is greater than the longitudinal projection $\Delta L_2$ of the front translational deflection.

Two significant results of the above analysis should be noted. (1) The absolute change in the length of either the front end 19'' or the rear end 19''' is small since the rotational and translational deflections in each end are in opposite directions. (2) The net deflection in the front end is outward, whereas the net deflection in the rear end is inward. Thus, insofar as truss ends A and B actually move, they move in substantially parallel paths thereby maintaining the separation distance between end points essentially constant. This is to be contrasted with conventional trusses wherein the change in length due to all four deflections are additive so that a prohibitively heavy structure would be required to maintain the length within very close tolerances. Result (1) follows from the conditions that (a) the cap members at one side of each end of the truss be stiffer than those at the opposite side of the same end and (b) the end point of each section be spaced from the center of rotation in the direction of the stiffer side. Result (2) follows from the condition that the cap members at one end of the truss be stiffer than the corresponding cap members at the other end of the truss. Various ways of satisfying these conditions, in addition to the illustrated example, will be apparent to those skilled in the art. For example, the relative stiffness may be achieved by varying any combination of factors including the number, length, thickness and material of the cap members.

The center of rotation will always be closest the side of greatest stiffness, the exact location primarily depending upon the relative stiffness of the opposite sides. In the exemplary embodiment of FIG. 1, the center of rotation of both the front section 19'' and the rear section 19''' is located about 9 inches from the top of the middle truss section 19'. The front end of the truss is located 5.8 inches down from the top of the middle section at a distance of 171 inches from the center of rotation and the rear end of the truss is located 3.75 inches down from the top of the middle section at a distance of 293 inches. Under a loading increment of about 1 g., it is found that the net outward deflection of the front section is .0014 inch, the net inward deflection of the rear section is .00215 inch, so that the net change in length is only .00075 inch. The net change in the axial separation of the coils, considering both the truss and the fiberglass supporting tubes, is well within the limits of good signal resolution even in rough air. As an additional advantage, it should be noted that where, as in FIG. 1, the top cap members are stiffer than the bottom cap members, the center of the coils will be placed very nearly at the top of the truss and this requires very little extension of the landing gear struts 14', 15' in order to provide adequate ground clearance.

In addition to the requirement for the change in coil spacing, it is necessary to keep the transverse motion of one coil relative to the axis of the other coil less than 3.8 inches, and the rotation of one coil relative to the other less than .362° in order to maintain the noise at less than 20 p.p.m. for a 50 foot coil separation. These two requirements are quite adequately met by the boom structure of the present invention.

As indicated above, the front end of the truss is slightly lower than the back end. In order to bring the front transmitter coil 4 into coaxial alignment with the rear receiver coil 5, the fiberglass tube 20 is tilted slightly up. Precise coaxial alignment is effected by varying the thickness of the shims or washers 60 (FIG. 6a) in each of the three bathtub fittings 58 attached to tubes 21 and so varying the position of the coils 4 and 5 attached to the ends thereof.

Figure 9A:
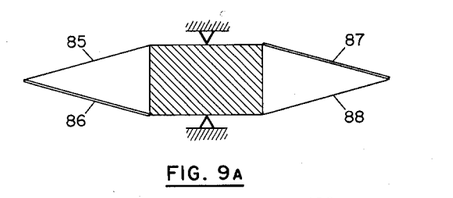
FIG. 9A is a modification of the truss of FIG. 9.

Another truss structure having non-symmetrical stiffness characteristics so that the longitudinal components of deflection are self-compensating is shown in FIG. 9A. On one end the lower set of cap members 86 is stiffer than the upper set of cap members 85, whereas on the opposite end the upper set of cap members 87 is stiffer than the lower set of cap members 88. A deflection analysis similar to that presented with respect to FIG. 9 readily verifies the fact that the longitudinal deflections are self-compensating and thus a lightweight structure of essentially constant length under varying load conditions is provided.

Figure 10:
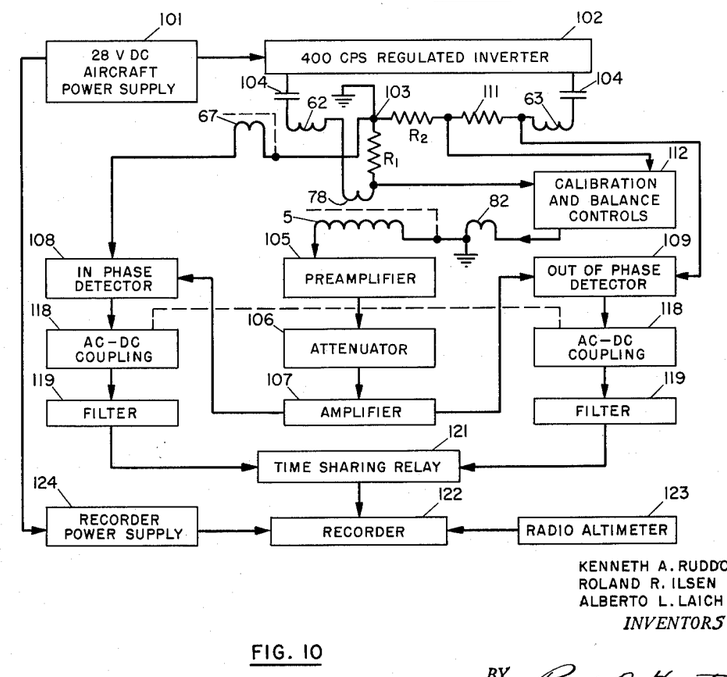
FIG. 10 is a block diagram of the electronic components of an electromagnetic detector in accordance with the present invention.

FIG. 10 is a block diagram illustrating the function of the various electronic components of the prospecting apparatus. The primary power source is a standard 28 volt D.C. aircraft power supply 101. Source 101 energizes a 250 watt, 400 cycle rotary inverter 102 which provides the exciting current flow to the transmitter coil 4, the magnitude and frequency of this current being stabilized by regulators contained within the inverter chassis. The two halves 62 and 63 of the transmitter coil are balanced and the system is grounded at the coil center tap 103. In order to maintain a balanced system and minimize capacitive coupling, the transmitter circuit is resonated by equal capacitors 104 in series with each line from the inverter to the transmitter coil. The exciting current is maintained at about 2.2 amps. As the Q factor of coil 4 is quite high, the voltage thereacross is about 3000 volts.

The buck-out coil 78 is connected in series between the split halves 62, 63 of the transmitter coil 4 and is located along slots 81 in tube 21 at a position such that the magnetic field produced thereby opposes the magnetic field produced by coil 4 so as to produce a region of zero net magnetic field at the location of electrostatically shielded receiver coil 5. This configuration has the advantage that the elimination of the receiver coil voltage due to the primary field is unaffected by variations in the transmitter coil current and frequency.

Secondary magnetic fields linking the receiver coil 5, which are due to eddy currents in conductive bodies lying within the field of the primary coil, will induce a signal voltage in the coil 5 which leads the secondary field by a phase angle of 90°. Thus, an in-phase field component will result in an out-of-phase voltage component and conversely an out-of-phase field component will result in an in-phase voltage component. The voltage induced in receiver coil 5 is amplified approximately 1000 times by preamplifier 105, and is fed through attenuator 106 into an amplifier 107 having a gain of about 160 between its input and each of two identical output connections to phase sensitive detectors 108, 109. The attenuator 106 is normally used only in reducing very strong signals, such as those resulting from major conductive bodies under shallow cover and for detailed follow-up examination of major anomalies, thereby preventing the overloading of the following amplifier stages.

The reference signal for detector 108 is an out-of-phase voltage obtained from the electrostatically shielded pick-up coil 67 which is inductively coupled to the transmitter coil 4. Detector 108 thus measures the out-of-phase voltage component which is proportional to the in-phase component of the secondary magnetic field. Accordingly, detector 108 is referred to as the in-phase detector. The reference signal for detector 109 is an in-phase voltage obtained across a 2.3 ohm resistor 111 in series with the center tap 103. Thus, detector 109 measures the in-phase voltage component proportional to the out-of-phase secondary field component, and is referred to as the out-of-phase detector.

The previously discussed balancing adjustment in the buck-out coil 78 is indicated by a zero output from the in-phase detector 108. However, slight drifts occur due to changing ground effects on take-off and dimensional changes caused by temperature variation. Also an out-of-phase magnetic field, resulting from eddy currents in the metal parts of the aircraft and the supporting boom, links the receiver coil 5. Under these conditions, the system can be returned to the balanced condition of zero direct field by means of a control unit 112 which sends small in-phase and out-of-phase currents through the coil 82 which is closely coupled to the receiver coil 5. The system can also be calibrated and tested by sending known currents, either in-phase or out-of-phase, from unit 112 to coil.

Figure 11:
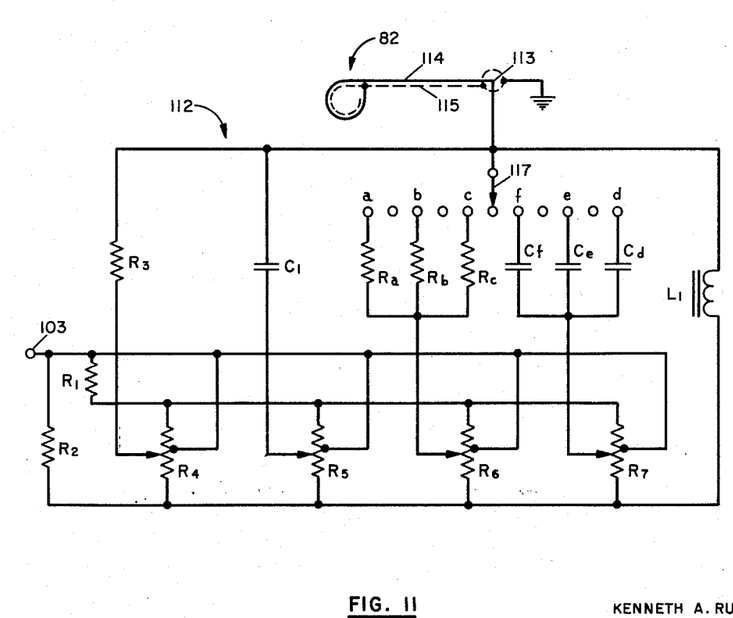
FIG. 11 is a schematic diagram of a buck-out and calibration circuit in accordance with the present invention.

FIGURE 11 is a circuit diagram of control unit 112. Small wire resistors $R_1$ and $R_2$ (.05 ohm each) placed in series on opposite sides of the system ground 103 provide reference signals (about 0.1 volt) of opposite polarity to the opposite terminals of four parallel 10 ohm potentiometers $R_4$, $R_5$, $R_6$, and $R_7$. Thus, variable opposite polarity reference signals are obtained by positioning the potentiometer wiper contact on opposite sides of the grounded center point. The current flowing into the coil connector terminal is the sum of the currents in each of the branch impedances $R_3$, $C_1$, $R_a$, $R_b$, $R_c$, $C_d$, $C_e$, $C_f$, and $L_1$ connected thereto. Each branch current is determined by the ratio of the reference voltage applied thereto to the branch impedance, the branch impedances being large compared to the reference and control resistances $R_1$, $R_2$, $R_4$, $R_5$, $R_6$ and $R_7$. The calibration coil 82 is a single turn of coaxial cable with the end of the inner conductor 114 connected to the grounded outer conductor 115 to form a shielded single turn. This same type of connection is also used with respect to the single turn coaxial cable coils 67 and 78.

Coarse cancellation of the out-of-phase helicopter and boom fields over a suitably wide bandwidth is obtained by the current in inductance $L_1$ (.3 h.). Fine cancellation of the in-phase field component is obtained by the current in $R_3$, adjustable in polarity and magnitude at potentiometer $R_4$. And fine cancellation of the out-of-phase field component is obtained by the current in $C_1$, adjustable in polarity and magnitude by potentiometer $R_5$.

In-phase calibration signals of 1500 p.p.m., 300 p.p.m., and 50 p.p.m., respectively, are obtained by connecting switch 117 to terminals a, b and c, respectively. And out-of-phase calibration signals of 1500 p.p.m., 300 p.p.m., and 50 p.p.m., respectively, are obtained by connecting switch 117 to terminals d, e and f respectively. The proper setting of potentiometers $R_6$ and $R_7$ is obtained by measuring the voltage across the receiver coil due to the primary field with the buck-out coils disconnected. Switch 117 is then connected to terminal a and, with the buck-out coil reconnected, $R_6$ is adjusted until the signal in the receiver coil due to the current in coil 82 is 1500 p.p.m. of the measured primary field signal. The proper calibration signal will then also be obtained at terminals b and c since the conductance ratio $$\frac{1}{R_a}:\frac{1}{R_b}:\frac{1}{R_c}$$

is 1500:300:50. For example, $R_a=1000$ ohms, $R_b=5000$ ohms, and $R_c=30,000$ ohms. Next switch 117 is connected to terminal d and $R_7$ is adjusted until the coil 82 signal is again 1500 p.p.m. of the primary signal, the capacitive admittances of $C_d$, $C_e$ and $C_f$ also being in the ratio 1500:300:50. For example the capacitors are .4, .08 and .013 microfarads respectively. It will be noted that the calibration voltages, and hence the current through coil 82, are proportional to the transmitter coil current. Therefore once the potentiometer $R_6$ and $R_7$ are initially set, the p.p.m. values at terminals $a$—$f$ are independent of the transmitter coil current, the signals due to coils 4 and 82 being proportional to the respective currents therein.

Referring again to FIG. 10, the output of each phase sensitive detector 108, 109 is passed through a long time constant coupling network 118 and a filter 119. Units 118 eliminate slow changes in the D.C. signal level due to the unbalancing effect of temperature changes, ground conductivity changes, and variation in the altitude of the flight path. From time to time it is desirable to eliminate this compensation and readjust the fine buck-out currents in coil 82 and in the event a ganged switch enables the A.C. coupling to be by-passed. It is also desirable to be able to switch the A.C. coupling out of the system when doing detailed low altitude survey flights. Filter 119 is an RC integrating circuit which effectively narrows the overall pass band of the receiver, thus improving the signal to noise ratio.

The filtered outputs from units 119 are connected to a time sharing relay 121. A nonsymmetrical free running multivibrator operates the switch of relay 121 so that the in-phase and out-of-phase signals are fed to a two channel recorder 122 for periods of 250 milliseconds and 100 milliseconds, respectively. Thus, both the in-phase and out-of-phase signals are recorded on one recorder channel, and a continuous altitude signal from radio altimeter 123 is recorded on the other recorder channel. This scheme permits the use of a commercially available recorder with only two channels and results in a significant weight saving of 15 pounds in the recorder 122 and recorder power supply 124 energized by the aircraft D.C. supply 101. In addition, the time-sharing recorder channel presents a highly advantageous electro-magnetic anomaly signal display in that the separate in-phase and out-of-phase amplitudes and the phase angle of the signal are immediately apparent.

The heavier units 102, 123 and 124 are mounted in the equipment box 54 and hence do not burden the helicopter 1 when it is being used for other than electromagnetic surveying purposes. The other units are mounted in the helicopter cockpit in a readily removable manner. The electrical leads to the cockpit units pass through a cover plate over the inspection port in the floor of the helicopter cabin and are readily removed by unplugging the units and replacing the cover plate. The units of the system of FIG. 10 which have not been described in detail are of conventional design but transistorized and miniaturized to present a minimum of weight and installation problems.

Figure 12:
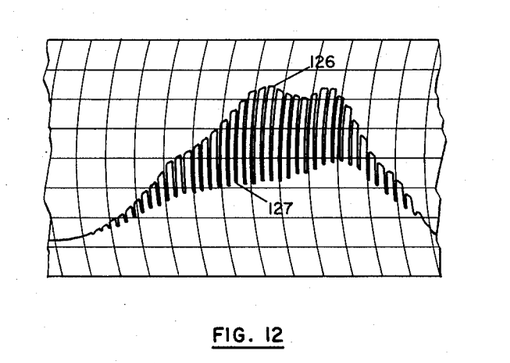
FIG. 12 is an electromagnetic anomoly signal record trace obtained with an airborne electromagnetic detector in accordance with the present invention.

FIG. 12 is an actual record trace obtained over a buried pyrite, pyrrhotite conducting body at an altitude of 200 feet and demonstrates the sensitivity and recognizability of the recorded signal. The curve 126 formed by the long dashes is the in-phase signal and the curve 127 formed by the short dashes is the out-of-phase signal.

The ratio of signal 126 to signal 127 is the cotangent of the phase angle. In the particular trace shown the phase angle during the period of the anomaly signal is always less than 45° since the in-phase signal is always greater than the out-of-phase signal. The sensitivity of the system is set at 1000 p.p.m. full scale recorder deflection due to the high strength of the anomaly signal. Under most normal surveying conditions the full scale deflection is set for 400 p.p.m.

Many modifications of the above-described embodiments will be apparent to those skilled in the art, including among other things: (1) the use of various numbers of coils in either or both of the transmitter and receiver systems, (2) the use of coplanar and other non-coaxial coil configurations, (3) the use of coils at different altitudes, and (4) the measuring of only a single field component, or only the net field, especially at two spaced frequencies.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Airborne electromagnetic prospecting apparatus comprising an aircraft body, a platform member rigidly secured to said aircraft body, a rigid, lightweight boom mounted on said platform member below said aircraft body in vibration isolated relationship from the body, said boom being mounted on the platform by a spring-cable suspension system, said suspension system comprising a plurality of spring-cable assemblies interconnecting said boom and said platform, said boom having a transmitter coil system and a receiver coil system mounted thereon in spaced apart relation, means for generating an alternating current in said transmitter coil system to thereby establish an alternating primary magnetic field, and means for detecting the secondary alternating magnetic field linking the receiver coil system which is generated by conducting bodies located in said primary field.

2. The apparatus of claim 1 further including mu-metal shields about the magnetos and generator of the aircraft thereby reducing the noise in the passband of the receiver coil system.

3. The apparatus of claim 2 wherein the transmitter coil conducting material has a low density times volume resistivity product for increased magnetic moment.

4. In an electromagnetic prospecting system the combination comprising a transmitter coil system for establishing a primary alternating magnetic field, a receiver coil for detecting the secondary alternating magnetic field linking the receiver coil system which is generated by conducting bodies located in said primary field, a single buck-out coil in series with said transmitter coil system, said buck-out coil generating a magnetic field at said receiver coil which coarsely balances the direct primary field thereat, a calibration coil closely coupled to said receiver coil, means for sending small in-phase and out-of-phase currents through said calibration coil for fine balancing of said primary field and for inducing calibration and testing signals of known magnitude in said receiver coil, said last-mentioned means comprising a pair of small resistors in series with said transmitter coil for providing reference voltages of opposite polarity to the opposite terminals of each of four low resistance potentiometers, a current limiting resistor in series with the wiper of said first potentiometer and said calibration coil, a current limiting reactance in series with the wiper of said second potentiometer and said calibration coil, a network of current limiting resistors, a switch for selectively placing each of said network resistors in series with the wiper of said third potentiometer, a network of current limiting reactances, a switch for selectively placing each of said network reactances in series with the wiper of said fourth potentiometer, said first potentiometer being adjustable to provide a precise in-phase balancing field, said second potentiometer being adjustable to provide a precise out-of-phase balancing field, said third potentiometer being adjustable to provide an in-phase calibration field of known magnitude through one of said network resistors whereby the ratio of the in-phase calibration field magnitudes through each of said network resistors is equal to the ratio of the conductances of said resistors, and said fourth potentiometer being adjustable to provide an out-of-phase calibration of known magnitude through one of said network reactances whereby the ratio of the out-of-phase calibration fields through each of said network reactances is equal to the ratio of the admittances of said reactances.

5. Airborne electromagnetic prospecting apparatus comprising a transmitter coil for establishing a primary alternating magnetic field, a receiver coil for detecting the secondary alternating magnetic field linking the receiver coil system which is generated by conducting bodies located in said primary field, means for separating said transmitter coil and said receiver coil at a large distance, a single buck-out coil in series with said transmitter coil system, said buck-out coil being adjustably positioned inwardly of said receiver coil to provide a magnetic field at said receiver coil which coarsely balances the direct primary field thereat, a calibration coil spaced between said buck-out coil and receiver coil for providing fine balancing and calibration fields at said receiver coil, means for supporting said receiver coil, said buck-out coil, and said calibration coil in fixed relative position, and flexible means for isolating said supporting means from mechanical vibrations in said coil separating means.

6. In an electromagnetic prospecting system the combination comprising a transmitter coil system for establishing a primary alternating magnetic field, a receiver coil system for detecting the secondary alternating magnetic field linking the receiver coil system which is generated by conducting bodies located in said primary field, means responsive to said receiver coil system for providing a first output proportional to the in-phase component of said secondary magnetic field, means responsive to said receiver coil system for providing a second output proportional to the out-of-phase component of said secondary magnetic field, a graphic recorder, and means for automatically and rapidly sequentially connecting said first and second outputs to a single recorder channel, said first output being connected for a first period and said second output being connected for a second period substantially different from said first period such that a readily comparable superimposed display of said outputs is presented by said recorder.

7. The combination of claim 6 including a disconnectable long time constant A.C. coupling network for eliminating slow changes in the signal level and a filter for narrowing the overall passband and improving the signal to noise ratio between each of said output and said connecting means.

8. A truss structure comprising a secured center section, two opposite reference sides, a first end section longitudinally extending from said center section and comprising a first set of at least one cap member having one end connected to said center section at one of said reference sides thereof and a second set of at least one cap member having one end connected to said center section at the other of said reference sides thereof, and a second end section extending longitudinally from said center section and comprising a third set of at least one cap member having one end connected to said center section at one of said reference sides thereof and a fourth set of at least one cap member having one end connected to said center section at the other of said reference sides thereof, the other ends of said first and second cap members being joined together and the other ends of said third and fourth cap members being joined together to form a rigid truss section in combination with said center section, said first set having a stiffness greater than the stiffness of said second set and said third set having a stiffness greater than the stiffness of the fourth set whereby the length of said structure remains essentially constant under changing load conditions.

9. The truss structure of claim 8 wherein said rigid truss section is a triangular truss section.

10. A truss structure according to claim 8 wherein the end of said first section is transversely positioned between the center of rotation of said first section and the location at which said first cap member set attaches to said center section, said third cap member set is connected to said center section at the same side as said first cap member set and is stiffer than either one of said fourth cap member set or said first cap member set, and the end of said second section is transversely positioned between the center of rotation of said second section and the location at which said third set attaches to said center section.

11. In combination: an aircraft body; a platform structure rigidly secured to said aircraft body and comprising a long longitudinally extending member and a pair of short transversely extending members secured at the midpoints thereof to the ends of said longitudinally extending member; a boom structure surrounding said platform; and a suspension system for supporting said boom relative to said platform and in substantially fixed position thereto, said suspension system comprising a plurality of spring-cable assemblies attached to each of four attachment points at opposite ends of said pair of transverse members, the center of gravity of said boom being located at a point on the longitudinally extending member of said platform, the spring constant in any direction at each of said attachment points being inversely proportional to the distance of said attachment point from said center of gravity, the sum of said spring constants being equal to that of a single spring through the center of gravity which yields a translational frequency less than any vibrational frequency in the aircraft body but greater than the stick movement frequency, whereby vibrations for said aircraft body are not transmitted to said boom and the boom does not change any of the natural vibration frequencies of the aircraft.

12. The combination of claim 11 further including a weight shifting structure on said boom for accurately locating the center of gravity point on said longitudinally extending member.

13. In combination: an aircraft body; a platform structure rigidly secured to said aircraft body; a boom including a triangular truss structure surrounding said platform structure, said truss structure comprising two upper cap members and lower cap member midway between said upper cap members; and a suspension system for mounting said boom in vibration isolated relation relative to said platform and in substantially fixed relation thereto, said system comprising a plurality of spring-cable assemblies running from said platform structure to said cap members.

14. The combination of claim 13 wherein a quick-disconnect joint is included in each cap member, a pair of tubes extends fore and aft of said truss, said tubes being attached to said truss by means of a plurality of bathtub fittings circumferentially spaced on said tubes and extending into attachment plugs inserted in both ends of each cap member, and said platform is removable from said aircraft by means of bolted connections.

15. The combination of claim 14 wherein said tubes are of non-metallic construction, a vertical electromagnetic prospecting transmitter coil is supported at the end of said fore tube, an electromagnetic prospecting receiver coil is supported coaxially with said transmitter coil at the end of said aft tube, mu-metal shields are provided about the magnetos and generators of the aircraft for reducing the noise in the passband of the receiver coil, the transmitter coil conductor has a low density times volume resistivity product for increased magnetic moment, and a camera and electronic equipment box are located on opposite ends of a weight shifting structure located on the upper cap members of said truss at a position which accurately places the center of gravity of the mass suspended from said suspension system in the plane of said platform structure thereby providing the maximum of vibration isolation.

16. The combination of claim 15 further comprising means responsive to said receiver coil for providing separate output signals proportional to the in-phase and out-of-phase components, respectively, of magnetic fields generated by conducting bodies in the magnetic field generated by said receiver coil, and means for sequentially connecting said outputs to a single recorder channel.

17. The combination of claim 16 further including a receiver coil rigidly secured to the end of a small non-metallic tube, a single buck-out coil in series with said transmitter coil and adjustably secured on said small tube inwardly of said receiver to provide a magnetic field at said receiver coil which coarsely balances the direct field from said transmitter coil, a calibration coil secured on said small tube between said buck-out coil and said receiver coil, said small tube being mounted interior to said aft tube by means of circumferentially spaced flexible vibration isolating mounts, and means for sending small in-phase and out-of-phase currents through said calibration coil for fine balancing of said direct field and for inducing calibration and testing signals of known magnitude in said receiver coil.

References Cited in the file of this patent

UNITED STATES PATENTS

| | | |
|---|---|---|
| 1,007,405 | Wagner et al. | Oct. 31, 1911 |
| 1,782,525 | Allen | Nov. 25, 1930 |
| 2,220,070 | Aiken | Nov. 5, 1940 |
| 2,608,602 | Muffly | Aug. 26, 1942 |
| 2,788,483 | Doll | Apr. 9, 1957 |
| 3,015,060 | McLaughlin et al. | Dec. 26, 1961 |
| 3,076,928 | Waters | Feb. 5, 1963 |

FOREIGN PATENTS

| | | |
|---|---|---|
| 204,351 | Australia | Nov. 16, 1956 |
| 210,928 | Australia | Oct. 24, 1957 |
| 231,737 | Australia | Dec. 19, 1960 |